UNITED STATES PATENT OFFICE.

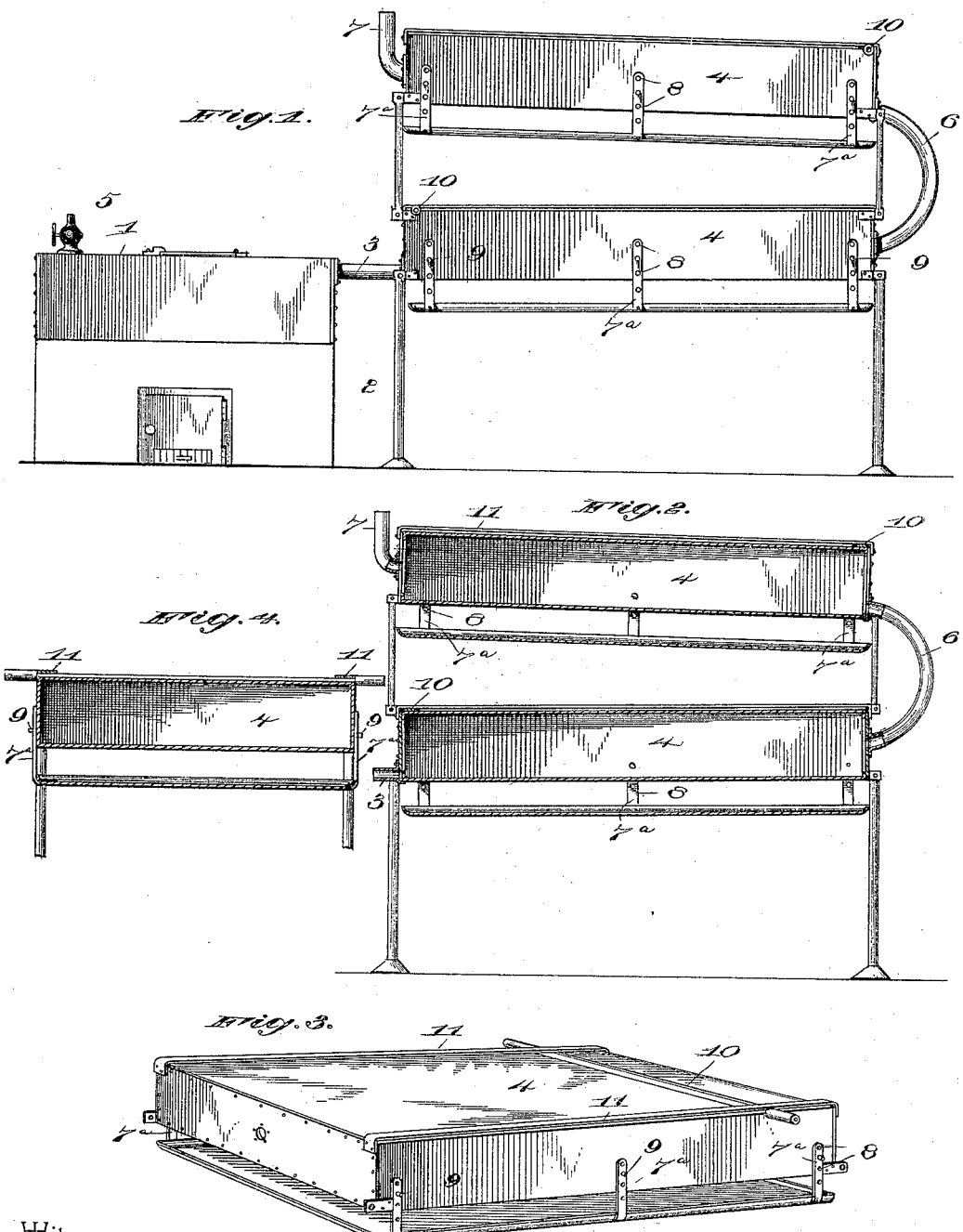

THOMAS F. PARSONS, OF NULIN, NORTH CAROLINA.

FRUIT-DRIER.

SPECIFICATION forming part of Letters Patent No. 640,936, dated January 9, 1900.

Application filed March 1, 1899. Serial No. 707,264. (No model.)

*To all whom it may concern:*

Be it known that I, THOMAS F. PARSONS, a citizen of the United States, residing at Nulin, in the county of Alleghany and State of North Carolina, have invented a new and useful Fruit-Drier, of which the following is a specification.

The invention relates to improvements in fruit-driers.

The object of the present invention is to simplify and improve the construction of fruit-driers, to lessen the cost of construction, and to provide one of increased drying capacity in which the condensed steam will be returned to the boiler.

The invention consists in the construction and novel combination and arrangement of parts, as hereinafter fully described, illustrated in the accompanying drawings, and pointed out in the claims hereto appended.

In the drawings, Figure 1 is a side elevation of a fruit-drier constructed in accordance with this invention. Fig. 2 is a longitudinal sectional view of a portion of the fruit-drier. Fig. 3 is a detail perspective view of one of the steam-receptacles. Fig. 4 is a transverse sectional view of the same.

Like numerals of reference designate corresponding parts in all the figures of the drawings.

1 designates a boiler arranged over a firebox 2 and connected by a short pipe 3 with a steam-receptacle 4, upon which fruit to be dried is placed. The boiler which generates the steam may be of any desired size and is preferably provided with a suitable steam-valve 5, adapted to permit the escape of steam when desired, and thereby control the passage of steam through the pipe 3 to the drying devices.

Any number of steam-receptacles 4 may be employed, and, as illustrated in Figs. 1 and 2 of the accompanying drawings, they are connected by a curved pipe 6, and the upper receptacle 4 is provided at the end remote from the pipe 6 with a discharge-pipe 7, extending upward and adapted to permit the escape of steam. A series of steam-receptacles 4 may be arranged at each end of the boiler, if desired, although only one series is illustrated in the accompanying drawings. The steam-receptacles are reversely inclined, as clearly shown in Fig. 1 of the accompanying drawing, in order to cause any water resulting from the condensation of steam to drain back into the boiler.

In order to increase the drying capacity, each receptacle 4, as illustrated in Figs. 3 and 4 of the drawings, has a drying-pan adjustably suspended from it by means of upwardly-extending arms $7^a$, and the heat at the bottom of the receptacle is sufficiently great to dry fruit thoroughly. The arms $7^a$, which are arranged at intervals, are provided with perforations 8, located one above the other and adapted to receive studs 9, projecting from opposite sides of the receptacle 4, and this adjustment permits the suspended pan to be brought closer to the bottom of the receptacle 4 as the drying operation progresses, thereby enabling the fruit on the suspended pan to be thoroughly dried.

In order to prevent fruit upon the top of the receptacle 4 from sticking, a sliding knife 10 is provided and is arranged in suitable guides formed by bars 11. The knife consists of a bar or blade disposed transversely of the receptacle 4 and provided at its ends with suitable handles. The bars 11 extend longitudinally of the steam-receptacle 4, at opposite sides of the upper face thereof, and form intervening spaces or ways, their ends being secured to and spaced from the steam-receptacle. The knife is adapted to be moved longitudinally of the steam-receptacle 4 in the intervening spaces or ways between the bars 11 and the top of the steam-receptacle, and it is provided with a flat lower face and a convex upper face, forming opposite longitudinal bevels and providing sharp edges, which are adapted to free the fruit from the supporting-surface of the steam-receptacle.

The invention has the following advantages: The drying capacity of the device is greatly increased by the drying-pans, which are adjustably suspended from the bottoms of the steam-receptacles or driers proper, and the suspended pans may be brought closer to the heat as the drying progresses, so that fruit may be thoroughly dried both above and below the steam-receptacles. The sliding knife is adapted to be readily moved over the supporting-surface of the steam-receptacle and is capable of freeing the fruit and preventing the same from sticking, and the arrangement of the steam-pipes is such that the condensed steam is returned to the boiler. The knife, which is provided at each end with a handle, is adapted to be operated at either side of the drier, and the pans may be raised and lowered without disturbing their contents.

Changes in the form, proportion, and minor details of construction may be resorted to without departing from the spirit or sacrificing any of the advantages of this invention.

What I claim is—

1. In a device of the class described, the combination with a fire-box, and a boiler arranged over the same, of a vertical series of reversely-inclined steam-receptacles provided with upper fruit-supporting surfaces, the bottom receptacle being connected at one end with the boiler, a pipe connecting the other end of the bottom receptacle with the one above it, and the drying-pans adjustably suspended from the receptacles, substantially as described.

2. In a device of the class described, a drying device having a fruit-supporting surface and provided at opposite sides with guides, combined with a knife mounted in the guides and adapted to be moved over the fruit-supporting surface to prevent the fruit from sticking, said knife being provided at each end with a handle, to enable it to be operated at either side of the drier, substantially as described.

3. In a device of the class described, the combination of a drying device having a fruit-supporting surface, bars secured at their ends to and spaced from the fruit-supporting surface, and a knife operating in the spaces between the bars and the fruit-supporting surface and composed of a blade having a flat surface at its bottom and provided with a convex upper face, and handles arranged at the ends of the blade whereby the knife may be operated at either side of the drier, substantially as described.

4. In a device of the class described, the combination of a series of connected steam-receptacles provided with upper fruit-receiving surfaces and having longitudinal guides arranged at opposite sides thereof, and knives extending transversely of the fruit-receiving surfaces and arranged in the said guides and projecting laterally from the receptacles, substantially as described.

In testimony that I claim the foregoing as my own I have hereto affixed my signature in the presence of two witnesses.

THOMAS F. PARSONS.

Witnesses:
W. F. BIRCHETT,
MC. F. GILHAM.